United States Patent [19]
Goldman et al.

[11] Patent Number: 5,864,674
[45] Date of Patent: Jan. 26, 1999

[54] RECONFIGURABLE LAN AND METHOD OF ADDING CLIENTS THERETO

[75] Inventors: Shelley B. Goldman, East Brunswick; David Phillip Silverman, Somerville, both of N.J.

[73] Assignee: AT&T Corp., Middletown, N.J.

[21] Appl. No.: 778,481

[22] Filed: Jan. 3, 1997

[51] Int. Cl.[6] ................................................. G06F 13/00
[52] U.S. Cl. ........................................................ 395/200.51
[58] Field of Search .............................. 364/DIG. 12 MS, 364/DIG. 25 FIG; 370/224, 442; 395/200.3, 200.38, 200.39, 200.4, 200.48, 200.5, 200.51, 200.52, 200.53, 200.54, 200.55, 200.57, 200.58, 200.72, 200.61, 200.66

[56] References Cited

U.S. PATENT DOCUMENTS

| | | | |
|---|---|---|---|
| 4,745,597 | 5/1988 | Morgan et al. | 370/224 |
| 4,941,089 | 7/1990 | Fischer | 395/200.61 |

*Primary Examiner*—Robert B. Harrell

[57] ABSTRACT

A reconfigurable Local Area Network (LAN) and method of controlling the reconfigurable LAN. Clients connected to the LAN are connected according to priority, e.g., based on speed. New client requesting access to the LAN are inserted according to priority. First, a determination is made of where to place the new client so as to maintain the connection order. The new client is inserted between higher priority clients (faster clients) and lower priority clients (slower clients) than the new client.

31 Claims, 4 Drawing Sheets

RECONFIGURABLE LAN AND METHOD OF ADDING CLIENTS THERETO

FIELD OF THE INVENTION

This invention relates to trunk communications networks for computers and more specifically to trunk installations comprising local area networks (LANs).

DESCRIPTION OF RELATED ART

Computers cannot be inserted into a trunk system and communicate thereon in a random, disorganized manner, nor may they be inserted without regard to the integrity of the system as a whole. Thus, when a connected station is not contributing to any communication exchange through a trunk system or, when the station is disconnected from the trunk system, the trunk system must remain available for instant use or re-use. Hence, trunk systems are governed by specific procedures that must be followed when any computer is inserted into the trunk. These procedures are known as protocols.

Protocols exist at several levels of the communication process and involve both hardware and software. On insertion of a station into the trunk system, if the installation protocol for that station is interrupted due for any reason, then the connection is not made. Instead, the trunk system automatically bypasses the station, preserving the trunk system's integrity. Thus, to insert a station into the trunk, a number of electrical tests are performed sequentially. Only upon successful conclusion of all of the tests does the processing unit send a signal that connects the station into the trunk system. Consequently, these prior art trunks make adding or removing stations difficult. Indeed, changing stations is avoided to preserve trunk system integrity.

Several trunking system topologies are known, in the art, such as a star network configuration, master/slave network configuration, etc. The present invention relates most closely to Local Area Networks (LANs) known as the token ring network. In a token ring network, the trunk itself is a normally closed loop or ring. A number of entry points are provided around the ring. Stations may be inserted into the ring using switching relays. Any station in the ring can communicate with any other. Data circulates around the ring, passed from station to station. Only one station is allowed to use the ring at any one time, the station having the so-called "token". The station with the token is allowed to transmit a data package. Once the package has been transmitted that computer relinquishes its monopoly of the ring and the token passes to another computer on the ring. Due to this serial arrangement, adding a slow station at a critical point in the ring can create a communication bottleneck, slowing the entire LAN.

Thus, there is a need for a token ring type LAN with optimized inter-station communication.

SUMMARY OF THE INVENTION

The present invention is a reconfigurable Local Area Network (LAN) and method of controlling the reconfigurable LAN. Clients connected to the LAN are connected in order, based on a priority, such as speed. When a new client requests access to the LAN, a determination is made of where to place the new client so as to maintain the priority order. The new client is inserted between clients having a higher priority (faster speed) and clients having a lower priority (slower speed) than the new client.

DETAILED DESCRIPTION OF PREFERRED EMBODIMENTS

The token ring network is an example of the broader class of networks which are defined in the relevant Standards as "local area networks" (LANs) and, as the name suggests, they are particularly configured for use within a limited and confined circumference so that communication between stations is more or less direct, without using modems, etc. These LANs are covered by IEEE Standards, referred to as IEEE.802. There are also corresponding international standards. The "token ring" LAN is specifically covered by IEEE.802.5; Corresponding International Standard Number 8802.5, reference ISOTC 97 SC 6N 3244; and, BSI document reference number DD 136:1986.

Figure 1:
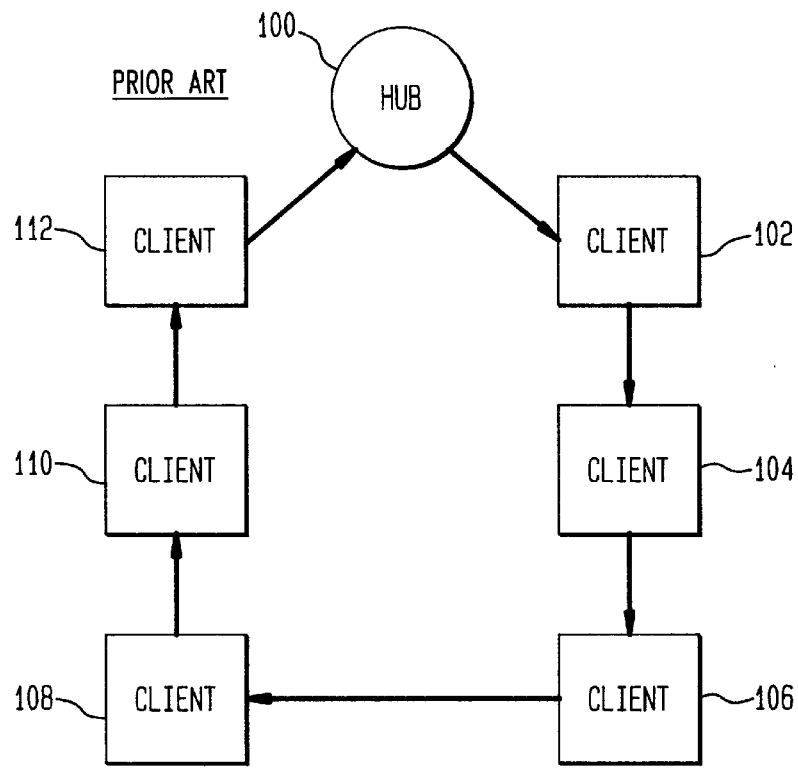
FIG. 1 is a representation of a prior art token ring LAN.

FIG. 1 is an example of a prior art token ring with hub 100 and six stations or clients 102–112 connected in a ring. Essentially, data from a server or mainframe computer (not shown) may be passed to the hub 100. Data passes from the hub 100 to client 102 and circulates around the ring until it reaches its destination, for example client 108. If client 108 has a response, that response is passed back to client 110 on the ring and, eventually, back to the hub 100. The hub may pass the data on to another client, e.g. 106, or back to the server or mainframe computer.

Compared to other LAN types, the token ring hub 100 has a relatively light load in that it handles no more data than any of the clients 102–112 in the ring. However, token ring LANs have the disadvantage in that a slow client slows down data transfer, which in turn slows down the ring. In particular, if client 102 is the slowest client on the ring, data passed from the hub 100 to subsequent clients 104–112 passes no faster than client 102 is able to pass it. This could be improved by placing client 102 later in the ring.

Figure 2:
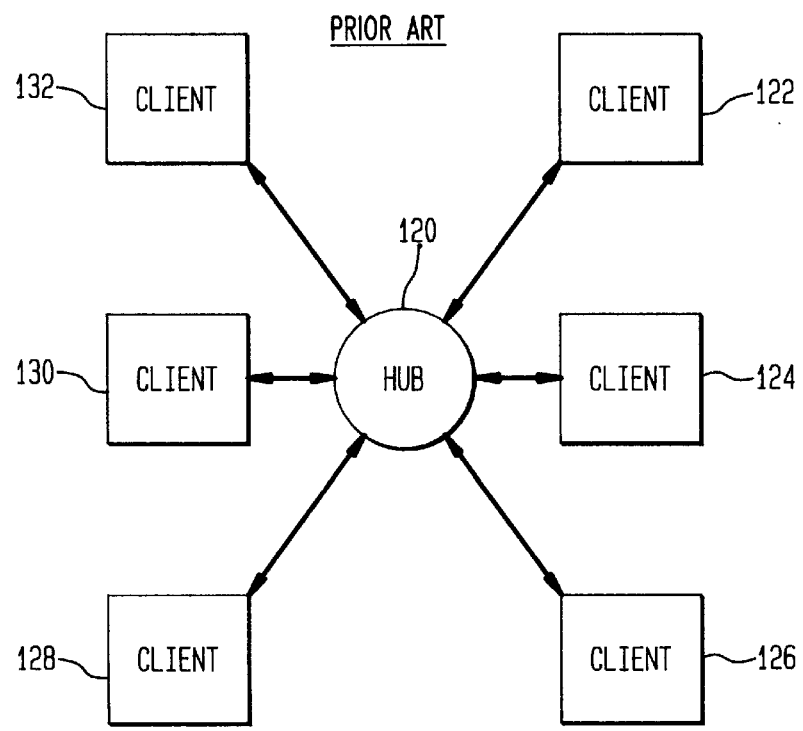
FIG. 2 is a representation of a prior art star LAN.

FIG. 2 is an example of a prior art star LAN. The star LAN also includes a hub 120 and, in this example, six clients 122, 124, 126, 128, 130 and 132. Each individual client 122–132 has a direct link to the hub 120 so data passes directly between the hub 120 and each client 122–132. Thus, a slow client 122–132 is not a drag on the network as compared with the token ring network in FIG. 1.

However, unlike the token ring LAN, the load on the star LAN hub depends on the activity of all of the star LAN clients. For example, if all six clients 122–132 request access equally, then the hub 120 activity is six times that of each client 122–132. Further, if all six clients have a heavy communication requirement, the clients' 122–132 communication bandwidth may be limited to one-sixth the bandwidth of the hub 120.

Figure 3:
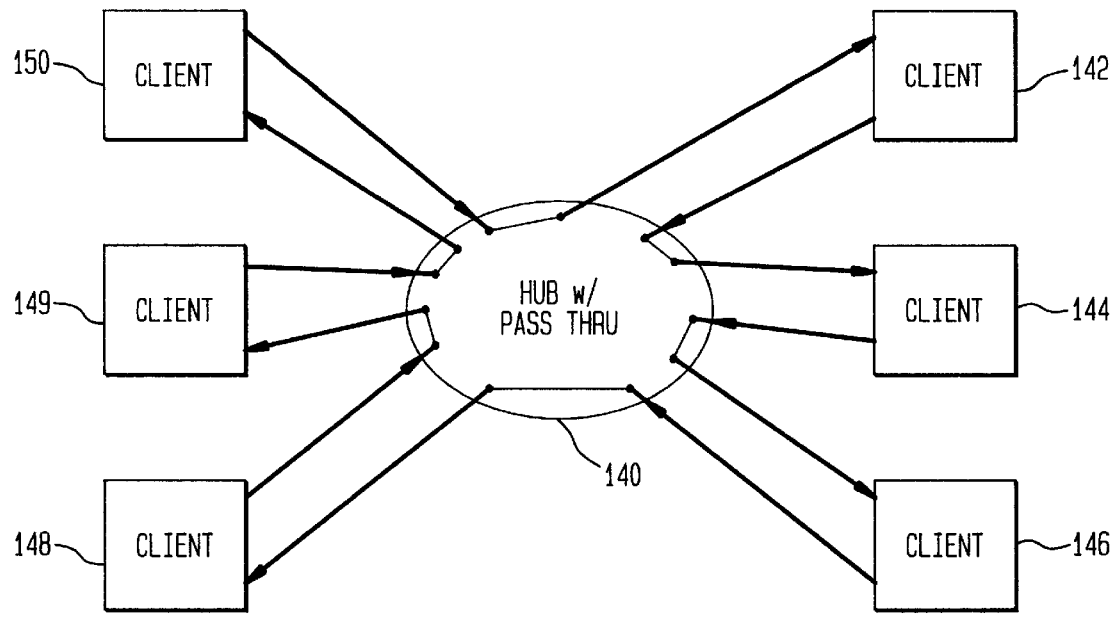
FIG. 3 is a representation of a token star LAN according to the preferred embodiment of the present invention.

FIG. 3 is a representation of a preferred LAN of the present invention, referred to herein as a token-star LAN, because it has characteristics of both the token ring LAN and the star LAN. Thus, the preferred LAN includes a hub 140 with pass-thru capability. FIG. 3, only shows six clients 142, 144, 146, 148, 149 and 150, for example, and is not intended as a limitation. In this embodiment, initially, the hub 140 acts as a dumb switch connecting clients 142–150 together. However, unlike the prior art token ring LAN of FIG. 1, for the preferred LAN, client order is not fixed, but dynamically set by the hub 140. So, for example, in FIG. 3 the clients are connected in a normal token ring configuration. In addition to acting as a dumb switch, the hub 140 maintains an active check of the status of each client 142–150 indicating which clients 142–150 are active and, therefore, connected to the LAN. Thus, the hub 140 ensures that all connections are to active clients. This hub 140 allows a very flexible configuration of clients 142–152 connected to the token star LAN.

Figure 4:
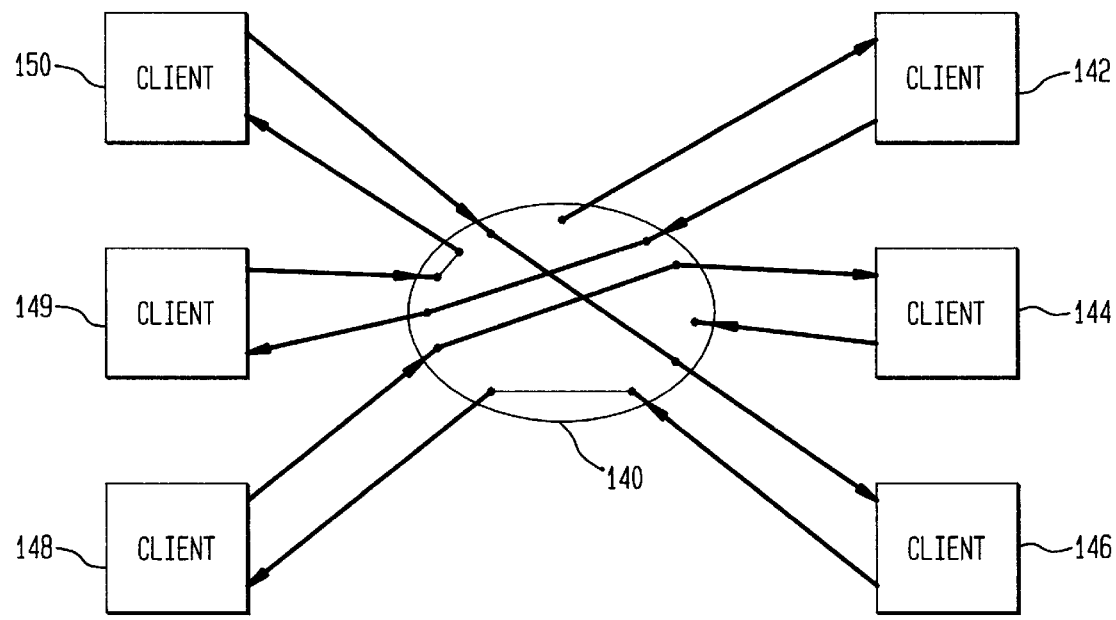
FIG. 4 is a representation of the preferred embodiment token star LAN of FIG. 3 reconfigured for optimum performance.

In particular, in the example of FIG. 4, the hub 140 reorders client connection, placing higher priority clients ahead of lower priority clients. Priority may be based on any selected criteria, e.g., speed, client activity or client authority. If, for example, priority were based on speed, faster clients would be given higher priority than slower clients. Additionally, down or inoperative clients, such as client 144 may be switched out of the ring. Thus, in this example, faster clients 142, 149 and 150 are chained together ahead of slower client 146. Client 146 may run at half the speed of clients 142, 144 and 146, but faster than slow client 148, which is connected at the end of the ring. Thus, in this example, the faster clients pass messages along quicker, avoiding a bottleneck that might otherwise occur if slow client 148 were placed earlier in the ring.

Figure 5:
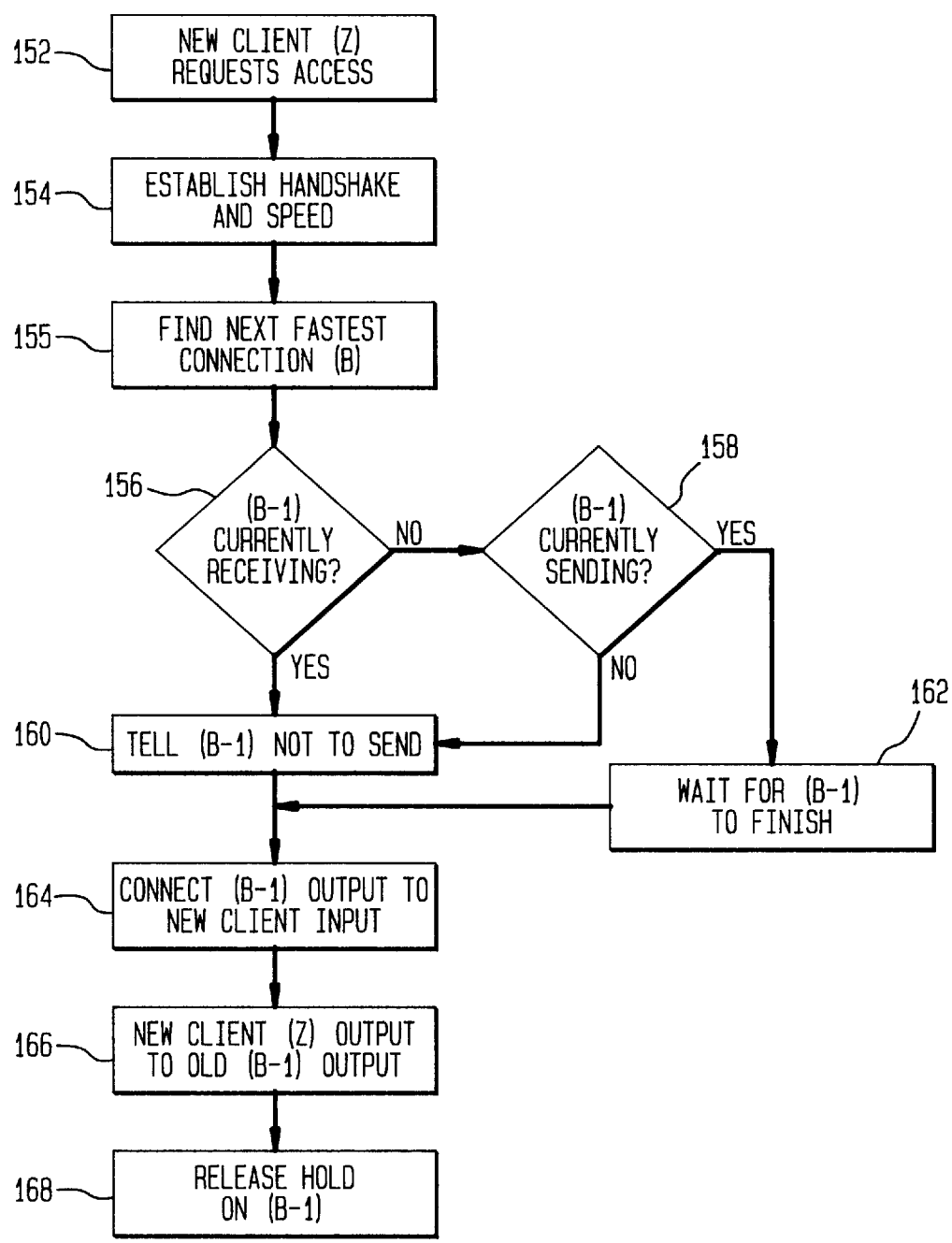
FIG. 5 is a flow diagram of adding a station to the preferred embodiment token star LAN.

FIG. 5 is a flow diagram for connecting to the preferred token star LAN. When a client requests access in step 152, the hub sends a handshake signal and establishes the new requesting client's speed in step 154. The hub polls the connected clients in step 155 to determine the point to insert the new (requesting) client, i.e. the new client is to be inserted between slower and faster current clients. This is described in more detail below with reference to FIG. 6.

After identifying the next fastest client (i.e. the best insertion point) in step 155, the next fastest client is checked to determine if it is currently active, i.e. receiving data in step 156 or sending data in step 158. If the next fastest client is not active or, is receiving data, then, the hub pauses it, issuing a command not to send data in step 160. Otherwise, if the next fastest client is sending, then the hub waits for it to finish sending data in step 162.

Either after the client completes sending data or, has been paused, the hub reconfigures the ring in step 164. The next fastest client's output is connected to the new client's input in step 164. Then, the new client's output is connected to what was the next fastest client's output in step 166. Thus, the new client has been inserted into the ring just after the next fastest client. After inserting the new client, the next fastest client is released in step 168, allowing it to send any data that is currently being held.

Figure 6:
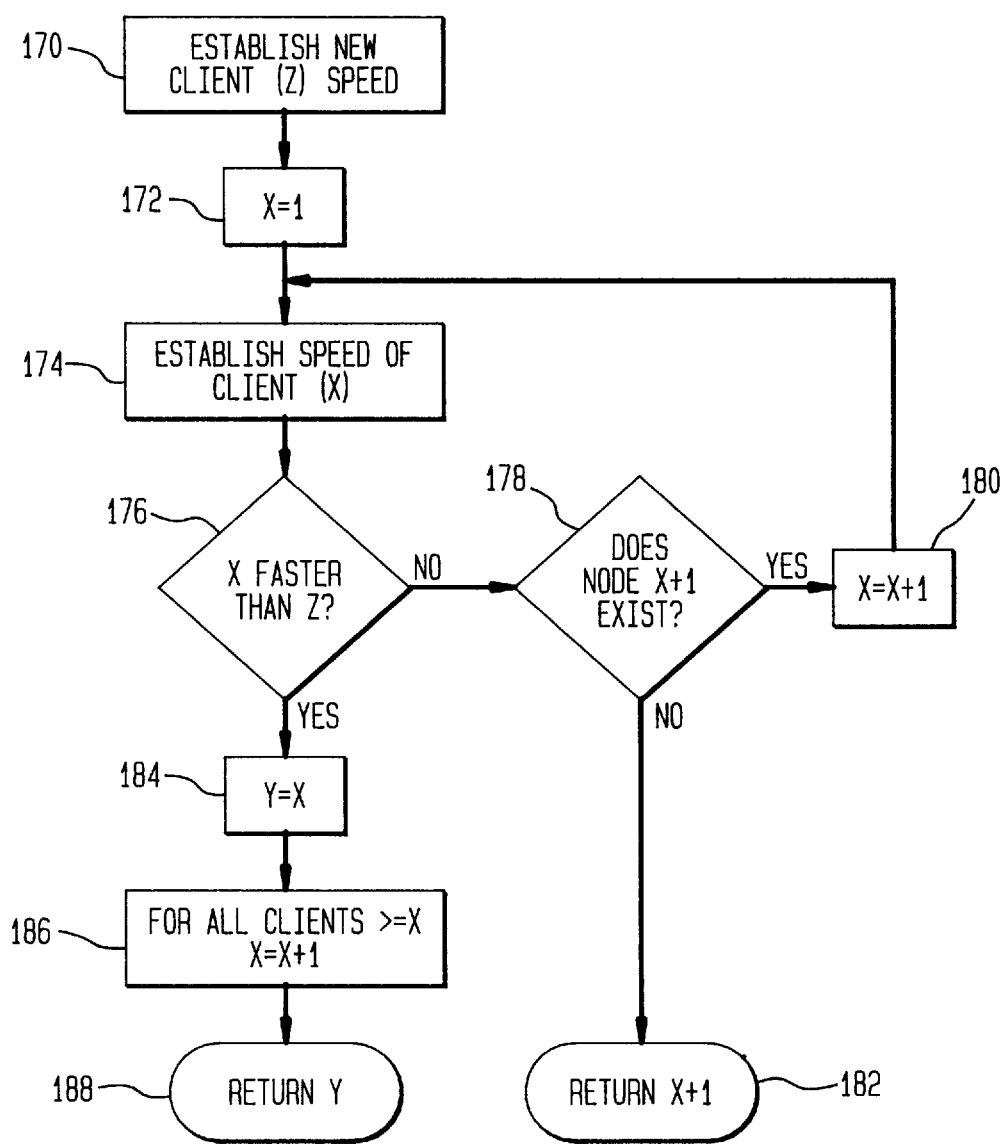
FIG. 6 is a flow diagram of client speed determination for the preferred embodiment token star LAN.

FIG. 6 represents how the optimum insertion point is determined for a new client in step 155 in FIG. 5. First, the new client's speed is established in step 170, which corresponds to step 154 in FIG. 5. An index, X, is initialized in step 172 to 1, starting the comparison of the new client against the current fastest client. The corresponding current client's speed is established in step 174 and checked in step 176 against the new client's speed.

If the new client's speed is slower than the corresponding current client's and, if other, slower clients are connected to the ring in step 178, the index is incremented in step 180 and the new client is compared against this next corresponding client in steps 174 and 176. Otherwise, if no slower clients are connected, the new client is to be inserted as the slowest client in step 182. Once a current client is established as slower than the new client in step 176, then that position is identified in step 184 as the insertion point. All slower clients are to be shifted 1 position in the ring in step 186. The insertion may begin in step 188 at step 156 in FIG. 5.

Thus, for a preferred embodiment token-star hub, higher priority clients are always located ahead of lower priority clients. This priority-based ordering of clients allows data to be passed to higher priority clients without being impeded by lower priority clients and with no impact to lower priority clients.

While the present invention has been described in terms of preferred embodiment various modifications and variations will occur to a person of ordinary skill in the art. It is intended that the appended claims include all such variations and modifications.

We claim:

1. A local area network including a hub and a plurality of clients connected serially in a ring, said local area network comprising:

means for receiving a request for network access from a new client;

means for establishing a priority for said new client;

means for determining an insertion point for said new client; and means for inserting said new client at said insertion point.

2. The local area network of claim 1 wherein the means for determining the insertion point comprises:

means for comparing said new client's priority against the priority of each currently connected client; and means for selecting the insertion point responsive to said comparing means.

3. The local area network of claim 2 wherein priority is based on speed.

4. The local area network of claim 3 further comprising:

means for detecting whether said currently connected client is sending or receiving data;

means for pausing said currently connected client responsive to said detecting means.

5. The local area network of claim 4 further comprising means for releasing a paused currently selected client.

6. A method of adding a client to a network comprising the steps of:

a) receiving a request for network access from a new client;

b) establishing a speed for said new client;

c) polling currently connected clients to determine an optimum insertion point; and, d) inserting said new client at said optimum insertion point.

7. The method of claim 6 wherein a currently connected client is paused prior to inserting the new client.

8. The method of claim 7 wherein pausing said currently connected client comprises the steps of:

i) determining whether said currently connected client is receiving data;

ii) if said currently connected client is receiving data, pausing said currently connected client;

iii) otherwise, determining whether said currently connected client is sending data, if said currently connected client is not sending data, pausing said currently connected client; and iv) otherwise, waiting for said currently connected client to finish sending data and then pausing said currently connected client.

9. The method of claim 8 further comprising the step of releasing said paused currently selected client.

10. The method of claim 6 wherein polling is conducted from a fastest currently connected client to a slowest currently connected client.

11. The method of claim 10 wherein the polling step comprises the steps of:
   i) identifying a first currently connected client as the client being compared;
   ii) determining the speed of the client being compared;
   iii) checking the speed of the new client against the speed of the client being compared;
   iv) if the new client is slower than the client being compared, then if there are more clients, identifying the next connected client as the client being compared and repeating steps ii) and iii); otherwise,
   v) identifying the optimum insertion point as immediately after the client currently being compared.

12. A method of adding a client to a network comprising the steps of:
   a) receiving a request for network access from a new client;
   b) establishing a priority for said new client;
   c) determining an insertion point for said new client based on said priority; and
   d) inserting said new client at said insertion point.

13. The method of claim 12 wherein a currently connected client is paused prior to inserting the new client.

14. The method of claim 13 wherein pausing said currently connected client comprises the steps of:
   i) determining whether said currently connected client is receiving data;
   ii) if said currently connected client is receiving data, pausing said currently connected client;
   iii) otherwise, determining whether said currently connected client is sending data, if said currently connected client is not sending data, pausing said currently connected client; and
   iv) otherwise, waiting for said currently connected client to finish sending data and then pausing said currently connected client.

15. The method of claim 14 further comprising the step of releasing said paused currently selected client.

16. The method of claim 12 wherein the determining step comprises the steps of:
   i) identifying a first currently connected client as the client being compared;
   ii) determining the priority of the client being compared;
   iii) checking the priority of the new client against the priority of the client being compared;
   iv) if the new client's priority is lower than the client being compared, then if there are more clients, identifying the next connected client as the client being compared and repeating steps ii) and iii); otherwise,
   v) identifying the insertion point as immediately after the client currently being compared.

17. The method of claim 12 wherein the priority is based on speed and polling is conducted from a fastest currently connected client to a slowest currently connected client.

18. A method of adding a client to a network comprising the steps of:
   a) receiving a request for network access from a new client;
   b) establishing a speed for said new client;
   c) polling currently connected clients to determine an optimum insertion point;
   d) pausing a currently connected client at said optimum insertion point;
   e) inserting said new client at said optimum insertion point; and,
   f) releasing said paused currently connected client.

19. The method of claim 18 wherein polling is conducted from a fastest currently connected client to a slowest currently connected client.

20. The method of claim 19 wherein the polling step comprises the steps of:
   i) identifying a first currently connected client as the client being compared;
   ii) determining the speed of the client being compared;
   iii) checking the speed of the new client against the speed of the client being compared;
   iv) if the new client is slower than the client being compared, then if there are more clients, identifying the next connected client as the client being compared and repeating steps ii) and iii); otherwise,
   v) identifying the optimum insertion point as immediately after the client currently being compared.

21. The method of claim 18 wherein the pausing step comprises the steps of:
   i) determining whether said currently connected client is receiving data;
   ii) if said currently connected client is receiving data, pausing said currently connected client;
   iii) otherwise, determining whether said currently connected client is sending data, if said currently connected client is not sending data, pausing said currently connected client; and
   iv) otherwise, waiting for said currently connected client to finish sending data and then pausing said currently connected client.

22. A method of adding a client to a network comprising the steps of:
   a) receiving a request for network access from a new client;
   b) establishing a speed for said new client;
   c) polling currently connected clients to determine an optimum insertion point;
   d) pausing a currently connected client at said optimum insertion point;
   e) inserting said new client at said optimum insertion point; and,
   f) releasing said paused currently connected client.

23. The method of claim 22 wherein the pausing step comprises the steps of:
   i) determining whether said currently connected client is receiving data;
   ii) if said currently connected client is receiving data, pausing said currently connected client;
   iii) otherwise, determining whether said currently connected client is sending data, if said currently connected client is not sending data, pausing said currently connected client; and
   iv) otherwise, waiting for said currently connected client to finish sending data and then pausing said currently connected client.

24. The method of claim 22 wherein the polling step comprises the steps of:

i) identifying first currently connected client as the client being compared;

ii) determining the priority of the client being compared;

iii) checking the priority of the new client against the priority of the client being compared;

iv) if the new client's priority is lower than the client being compared, then if there are more clients, identifying the next connected client as the client being compared and repeating steps ii) and iii); otherwise, v) identifying the insertion point as immediately after the client currently being compared.

25. The method of claim 22 wherein the priority is based on speed and, polling is conducted from a fastest currently connected client to a slowest currently connected client.

26. A local area network including a hub and a plurality of clients connected serially in a ring, said local area network comprising:

means for receiving a request for network access from a new client;

means for establishing a speed for said new client;

means for determining an insertion point for said new client;

means for detecting whether a currently connected client at said insertion point is sending or receiving data;

means for pausing said currently connected client at said insertion point;

means for inserting said new client at said insertion point; and, means for releasing said paused currently selected client.

27. The local area network of claim 26 wherein the means for determining an insertion point comprises:

means for comparing said new client's priority against a priority of each currently connected client; and means for selecting an insertion point responsive to said comparing means.

28. A method of adding a client to a network comprising the steps of:

a) receiving a request for network access from a new client;

b) establishing a speed for said new client;

c) polling currently connected clients to determine an optimum insertion point comprising the steps of:

i) identifying first currently connected client as the client being compared, ii) determining the speed of the client being compared, iii) checking the speed of the new client against the speed of the client being compared, iv) if the new client is slower than the client being compared, then if there are more clients, identifying the next connected client as the client being compared and repeating steps ii) and iii), otherwise, v) identifying the optimum insertion point as immediately after the client currently being compared;

d) pausing a currently connected client at said optimum insertion point;

e) inserting said new client at said optimum insertion point; and, f) releasing said paused currently connected client.

29. The method of claim 28 wherein the pausing step comprises the steps of:

i) determining whether said currently connected client is receiving data;

ii) if said currently connected client is receiving data, pausing said currently connected client;

iii) otherwise, determining whether said currently connected client is sending data, if said currently connected client is not sending data, pausing said currently connected client; and iv) otherwise, waiting for said currently connected client to finish sending data and then pausing said currently connected client.

30. A local area network including a hub and a plurality of clients connected serially in a ring, said local area network comprising:

means for receiving a request for network access from a new client;

means for establishing a speed for said new client;

means for comparing said new client's speed against each currently connected client's speed; and means for selecting an insertion point responsive to said comparing means;

means for detecting whether a currently connected client at said insertion point is sending or receiving data;

means for pausing said currently connected client at said insertion point;

means for inserting said new client at said insertion point; and, means for releasing said paused currently selected client.

31. A method of adding a client to a network comprising the steps of:

a) receiving a request for network access from a new client;

b) establishing a speed for said new client;

c) polling currently connected clients to determine an optimum insertion point comprising the steps of:

i) identifying first currently connected client as the client being compared, ii) determining the speed of the client being compared, iii) checking the speed of the new client against the speed of the client being compared, iv) if the new client is slower than the client being compared, then if there are more clients, identifying the next connected client as the client being compared and repeating steps ii) and iii), otherwise, v) identifying the optimum insertion point as immediately after the client currently being compared;

d) pausing a currently connected client at said optimum insertion point comprising the steps of:

i) determining whether said currently connected client is receiving data, ii) if said currently connected client is receiving data, pausing said currently connected client, iii) otherwise, determining whether said currently connected client is sending data, if said currently connected client is not sending data, pausing said currently connected client, and iv) otherwise, waiting for said currently connected client to finish sending data and then pausing said currently connected client;

e) inserting said new client at said optimum insertion point; and, f) releasing said paused currently connected client.

* * * * *